United States Patent
Lan et al.

(10) Patent No.: US 10,036,928 B2
(45) Date of Patent: Jul. 31, 2018

(54) LIQUID CRYSTAL DISPLAY PANEL

(71) Applicant: Au Optronics Corporation, Hsinchu (TW)

(72) Inventors: Yi-Fen Lan, Taichung (TW); Pu-Jung Huang, New Taipei (TW); Cheng-Yeh Tsai, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 3 days.

(21) Appl. No.: 15/447,136

(22) Filed: Mar. 2, 2017

(65) Prior Publication Data

US 2017/0255035 A1 Sep. 7, 2017

(30) Foreign Application Priority Data

Mar. 2, 2016 (TW) .............................. 105106402 A

(51) Int. Cl.
| | |
|---|---|
| *G02F 1/1347* | (2006.01) |
| *G02F 1/1343* | (2006.01) |
| *G02F 1/1337* | (2006.01) |
| *G02F 1/137* | (2006.01) |
| *G02F 1/133* | (2006.01) |

(Continued)

(52) U.S. Cl.
CPC .......... *G02F 1/137* (2013.01); *G02F 1/13306* (2013.01); *G02F 1/134309* (2013.01); *G02F 1/134363* (2013.01); *G02F 1/1337* (2013.01); *G02F 1/13439* (2013.01); *G02F 1/136286* (2013.01); *G02F 2001/13793* (2013.01); *G02F 2001/133769* (2013.01); *G02F 2001/134318* (2013.01); *G02F 2201/121* (2013.01); *G02F 2201/123* (2013.01)

(58) Field of Classification Search
CPC ......................... G02F 1/134363; G02F 1/1337
USPC ........................................................ 349/141
See application file for complete search history.

(56) References Cited

U.S. PATENT DOCUMENTS

| | | | |
|---|---|---|---|
| 6,583,840 B1 * | 6/2003 | Inoue ................ | G02F 1/133707 349/113 |
| 6,977,706 B2 | 12/2005 | Wu et al. | |

(Continued)

FOREIGN PATENT DOCUMENTS

| | | |
|---|---|---|
| CN | 102012588 | 4/2011 |
| CN | 102640041 | 8/2012 |

(Continued)

*Primary Examiner* — Wen-Ying P Chen
(74) *Attorney, Agent, or Firm* — JCIPRNET

(57) ABSTRACT

A liquid crystal display (LCD) panel includes a first substrate, electrode patterns, a second substrate, and a liquid crystal (LC) layer. The electrode patterns are located on the first substrate, and a lateral electric field is generated via the electrode patterns according to a driving voltage. The second substrate is located opposite to the first substrate. The LC layer is located between the first and second substrates and includes a voltage driven LC layer and an induced LC layer. The voltage driven LC layer is located on the electrode patterns and is driven by the driving voltage to be optically anisotropic or optically isotropic. The induced LC layer is located between the voltage driven LC layer and the second substrate and induced to be optically anisotropic when the voltage driven LC layer is driven to be optically anisotropic. A thickness of the LC layer is larger than 4 μm.

10 Claims, 12 Drawing Sheets

(51) Int. Cl.
G02F 1/1333 (2006.01)
G02F 1/1362 (2006.01)

(56) References Cited

U.S. PATENT DOCUMENTS

| | | | |
|---|---|---|---|
| 8,343,595 B2 | 1/2013 | Haseba | |
| 2001/0005253 A1 | 6/2001 | Komatsu | |
| 2005/0179847 A1 | 8/2005 | Miyachi et al. | |
| 2006/0146249 A1* | 7/2006 | Choi | G02F 1/134363 349/141 |
| 2010/0182558 A1 | 7/2010 | Lu et al. | |
| 2013/0321754 A1 | 12/2013 | Chien et al. | |

FOREIGN PATENT DOCUMENTS

| | | |
|---|---|---|
| CN | 104880882 | 9/2015 |
| JP | 2010026324 | 2/2010 |
| TW | 1518424 | 1/2016 |

* cited by examiner

LIQUID CRYSTAL DISPLAY PANEL

CROSS-REFERENCE TO RELATED APPLICATION

This application claims the priority benefit of Taiwan application serial no. 105106402, filed on Mar. 2, 2016. The entirety of the above-mentioned patent application is hereby incorporated by reference herein and made a part of this specification.

BACKGROUND

Field of the Disclosure

The disclosure relates to a display panel and in particular to a liquid crystal display (LCD) panel.

Description of Related Art

In 1888 A.D., Friedrich Reinitzer placed a cholesteric benzoate in a polarizing microscope and observed that the cholesteric benzoate appears in different colors (blue-violet and blue) as in an isotropic phase and in a cholesteric phase, and a color variation phenomenon between the isotropic phase and the cholesteric phase merely exists within a rather small temperature range (about a temperature range of 1° C.). In 1970 A.D., a number of scientists confirmed the above-mentioned phenomenon is a new thermodynamically stable phase through conducting volumetric analysis, using high resolution differential scanning calorimetry, and so forth. Said phenomenon is referred to as blue phase (BP).

Normal liquid crystal (LC) is optically anisotropic; by contrast, the BP LC is optically isotropic. In other words, the BP LC has a very low birefringence or does not even have a birefringence. Since the periodic lattice of the BP is a function of a visible light wavelength, a selective bragg reflection may occur. This feature enables the BP LC to be applied to the use of fast light modulators. However, no matter in terms of a theoretical prediction or an experimental observation, the BP LC merely appears in molecular materials possessing high purity and high chirality, thus causing the BP LC to merely exist within a very small temperature range. This is the reason why the BP LC is often discussed in an academic field, whereas the practical application of the BP LC is rather difficult.

In the last decade, in order to enable the display quality of the LCD panel to override the display quality of the cathode ray tube display, the BP LC featuring a rapid response speed again receives the attention from the academia and the industry. To meet application demands, the BP LC is required to possess a wide temperature application range, and therefore different techniques have been proposed. For instance, a feature of stability of polymer (i.e., formation of a reticular polymer structure) is utilized to generate the BP that can exist within a wide range of temperature (see Nature materials, 2002, 1, 64). In addition, in 2002 A.D., Kikuchi et al. successfully produced the BP LC characterized by a temperature range of approximately 60° C. and a stable, gel-like structure. Although the BP LC has the advantages of short response time and optical isotropy, it has the disadvantage of the relatively high driving voltage, which can reach up to 55 volts. From the viewpoint of mass production, the high driving voltage of the BP LC is one of the problems which demands solutions.

SUMMARY

The disclosure provides an LCD panel is capable of lowering a saturation electric field and reducing a driving voltage required for driving the LCD panel without compromising the transmission rate of the LCD panel.

In an embodiment of the disclosure, an LCD panel that includes a first substrate, a plurality of electrode patterns, a second substrate, and an LC layer is provided. The electrode patterns are located on the first substrate, and a lateral electric field is generated via the electrode patterns according to a driving voltage. The second substrate is located opposite to the first substrate. The LC layer is located between the first substrate and the second substrate and includes a voltage driven LC layer and an induced LC layer. The voltage driven LC layer is located on the electrode patterns and is driven by the driving voltage to be optically anisotropic or optically isotropic. The induced LC layer is located between the voltage driven LC layer and the second substrate and induced to be optically anisotropic when the voltage driven LC layer is driven to be optically anisotropic. A thickness of the LC layer is larger than 4 micrometers (μm).

In view of the above, the LC layer of the LCD panel provided herein is equipped with the voltage driven LC layer and the induced LC layer. Thereby, the LCD panel described herein not only has the advantages of the BP LC featuring the rapid response speed and the optical isotropy but also has the saturation electric filed that can be reduced by adjusting the cell gap between two substrates. Moreover, when a relatively low driving voltage is applied to drive the LCD panel, the transmission rate can be maintained to a certain level.

In order to make the aforementioned and other features and advantages of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
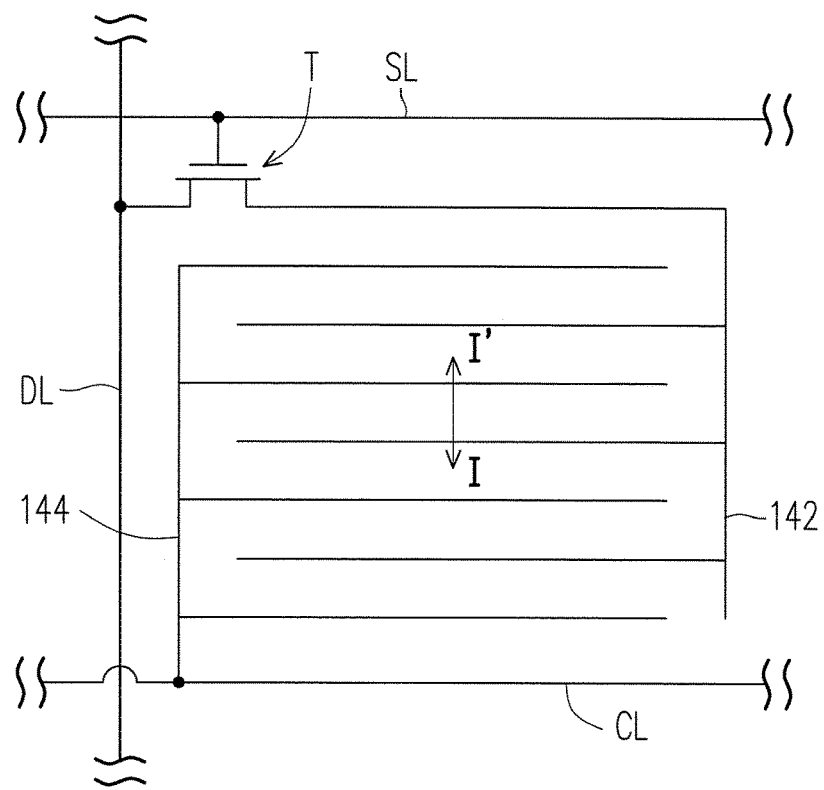
FIG. 1 is a schematic diagram illustrating a partial circuit of a pixel array layer of an LCD panel according to an embodiment of the disclosure.
Figure 2:
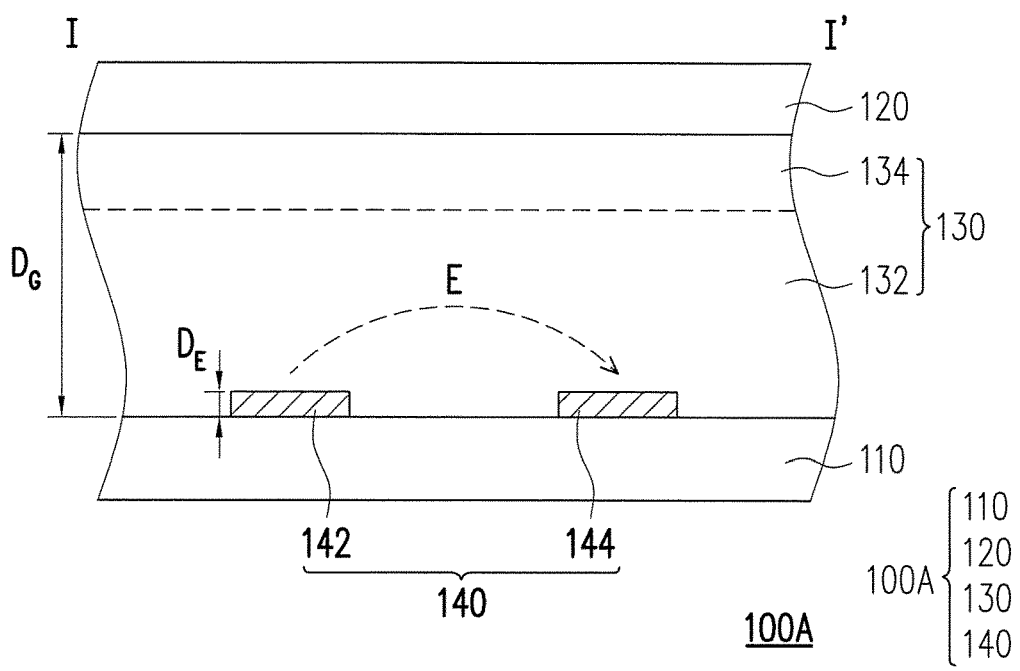
FIG. 2 is a cross-sectional view illustrating a portion of an LCD panel according to an embodiment of the disclosure.
Figure 3A:
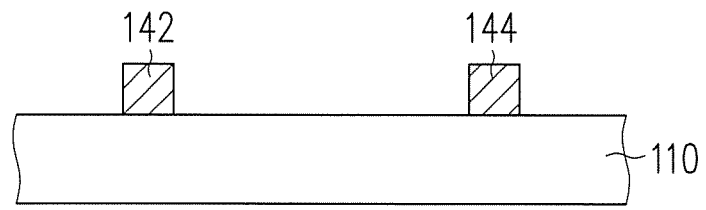
FIG. 3A to FIG. 3C are schematic cross-sectional views of electrode patterns according to embodiments of the disclosure.
Figure 3B:
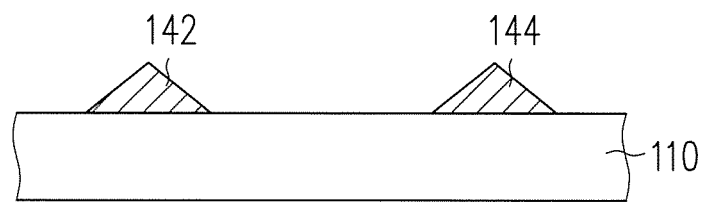
Figure 3C:
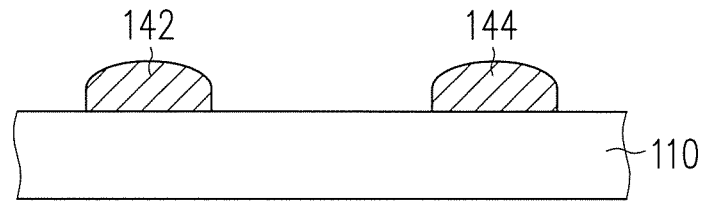

FIG. 1 is a schematic diagram illustrating a partial circuit of a pixel array layer of a display panel according to an embodiment of the disclosure. FIG. 2 is a cross-sectional view illustrating a portion of an LCD panel according to an embodiment of the disclosure. Specifically, the cross-sectional view is taken alone a sectional line I-I' in FIG. 1. FIG. 3A to FIG. 3C are schematic cross-sectional views of electrode patterns according to embodiments of the disclosure.

With reference to FIG. 2, the LCD panel 100A includes a first substrate 110, a plurality of electrode patterns 140, a second substrate 120, and an LC layer 130 between the first substrate 110 and the second substrate 120. Here, the LC layer 130 includes a voltage driven LC layer 132 and an induced LC layer 134.

The first substrate 110 may be made of glass, quartz, an organic polymer, an opaque/reflective material (such as a conductive material, metal, wafer, ceramics, or any other appropriate material), or any other appropriate material, which should not be construed as a limitation in the disclosure. A pixel array layer (shown in FIG. 1 but not shown in FIG. 2) is located on the first substrate 110, for instance. With reference to FIG. 1, one of the data lines DL, one of the scan lines SL, one of the common electrode lines CL, and one of the pixel structures (including an active device T, a pixel electrode 142, and a common electrode 144) of the pixel array layer are shown. A first end (e.g., a gate) of the active device T is connected to the scan line SL, and a second end (e.g., a source) of the active device T is connected to the data line DL. A third end (e.g., a drain) of the active device T is electrically connected to the pixel electrode 142. The active device T may serve as a switch device for writing voltage information into the pixel electrode 142 and may be a bottom-gate thin film transistor (TFT) or a top-gate TFT. The common electrode 144 is electrically connected to the common electrode line CL, and a common voltage (not shown) is applied to the common electrode 144, for instance. When the active device T is switched on, which allows the voltage information is written into the pixel electrode 142, a driving voltage (not shown) is applied to the pixel electrode 142, and the value of the driving voltage is different from that of the common electrode line CL, such that a voltage different exists between the pixel electrode 142 and the common electrode 144. At this time, an electric field is generated between the pixel electrode 142 and the common electrode 144, so as to drive the display medium.

With reference to FIG. 2, the pixel electrode 142 and the common electrode 144 together constitute a plurality of electrode patterns 140. The pixel electrode 142 and the common electrode 144 are located on the first substrate 110, and a lateral electric field E is generated between the pixel electrode 142 and the common electrode 144 according to the driving voltage. In the present embodiment, the electrode patterns 140 constituted by the pixel electrode 142 and the common electrode 144 have a thickness $D_E$ less than 0.5 μm, for instance. In the present embodiment, along the sectional line I-I', the shape of the pixel electrode 142 and the shape of the common electrode 144 are rectangle, as shown in FIG. 2, which should however not be construed as limitations in the disclosure. According to an embodiment of the disclosure, along the sectional line I-I', the shape of the pixel electrode 142 and the shape of the common electrode 144 are square (as shown in FIG. 3A), triangle (as shown in FIG. 3B), or polygon with curves (as shown in FIG. 3C), for instance. The pixel electrode 142 and the common electrode 144 may be transmissive electrodes, reflective electrodes, or transflective electrodes according to some embodiments of the disclosure. A material of the transmissive electrodes may include metal oxide, such as indium tin oxide (ITO), indium zinc oxide (IZO), aluminum tin oxide (ATO), aluminum zinc oxide (AZO), indium germanium zinc oxide (IGZO), other suitable oxides, or a stacked layer having at least two of the above materials. The reflective electrodes are made of a metallic material that is characterized by high reflectivity, which should not be construed as a limitation in the disclosure.

The second substrate 120 is located opposite to the first substrate 110, as shown in FIG. 2. The second substrate 120 may be made of glass, quartz, an organic polymer, an opaque/reflective material (such as a conductive material, metal, wafer, ceramics, or any other appropriate material), or any other appropriate material, which should not be construed as a limitation in the disclosure. Note that the material of the second substrate 120 may be the same as or different from the material of the first substrate 110. A color filter array layer (not shown) is arranged on the second substrate 120, for instance, and the color filter array layer may have the structure of the conventional color filter array layer. Since the detailed material and the structure of the conventional color filter array layer are well known to people having ordinary skill in the pertinent art, no further explanation will be given hereinafter.

With reference to FIG. 2, the LC layer 130 is located between the first substrate 110 and the second substrate 120. According to the present embodiment, the material of the LC layer 130 is a BP LC material (blue phase LC), for instance; however, the disclosure is not limited thereto. Specifically, the LC layer 130 includes the voltage driven LC layer 132 and the induced LC layer 134, as shown in FIG. 2. Here, the voltage driven LC layer 132 is located on the electrode patterns 140; besides, the driving action of the driving voltage (i.e., the lateral electric field E generated between the pixel electrode 142 and the common electrode 144) allows the voltage driven LC layer 132 to be driven and to be accordingly characterized by optical anisotropy or optical isotropy. The induced LC layer 134 is located between the voltage driven LC layer 132 and the second substrate 120 and induced to be optically anisotropic when the voltage driven LC layer 132 is driven to be optically anisotropic. Owing to the arrangement of the voltage driven LC layer 132 and the induced LC layer 134, the LC layer 130 has the advantages of short response time and optical isotropy; and the LC layer 130 can be driven by a relatively low driving voltage and maintain the transmission rate while the thickness $D_G$ of the LC layer 130 (i.e., the cell gap between the first substrate 110 and the second substrate 120) is large. In an embodiment, the thickness $D_G$ of the LC layer 130 is greater than 4 μm, preferably from about 7.5 μm to 9.2 μm, for instance.

Figure 4:
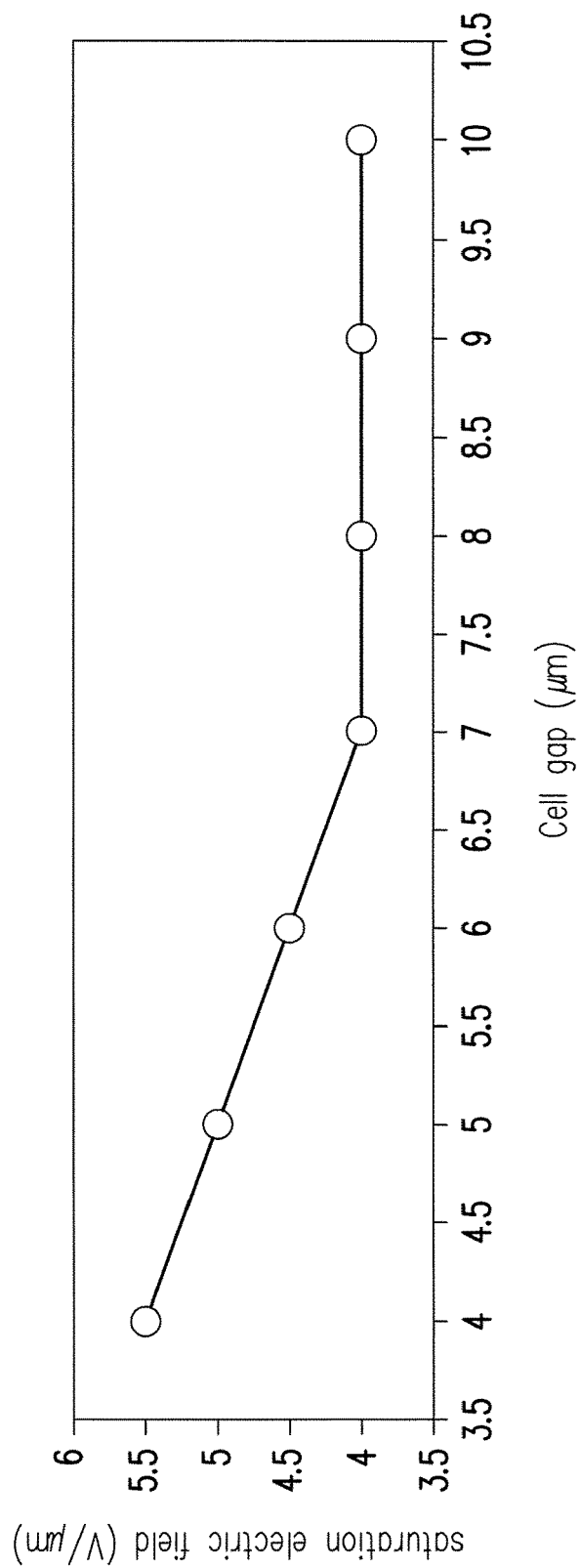
FIG. 4 illustrates a correlation between a cell gap and a saturation electric field of the LCD panel provided in FIG. 2.

FIG. 4 illustrates a correlation between a cell gap and a saturation electric field of the LCD panel provided in FIG.

Figure 13:
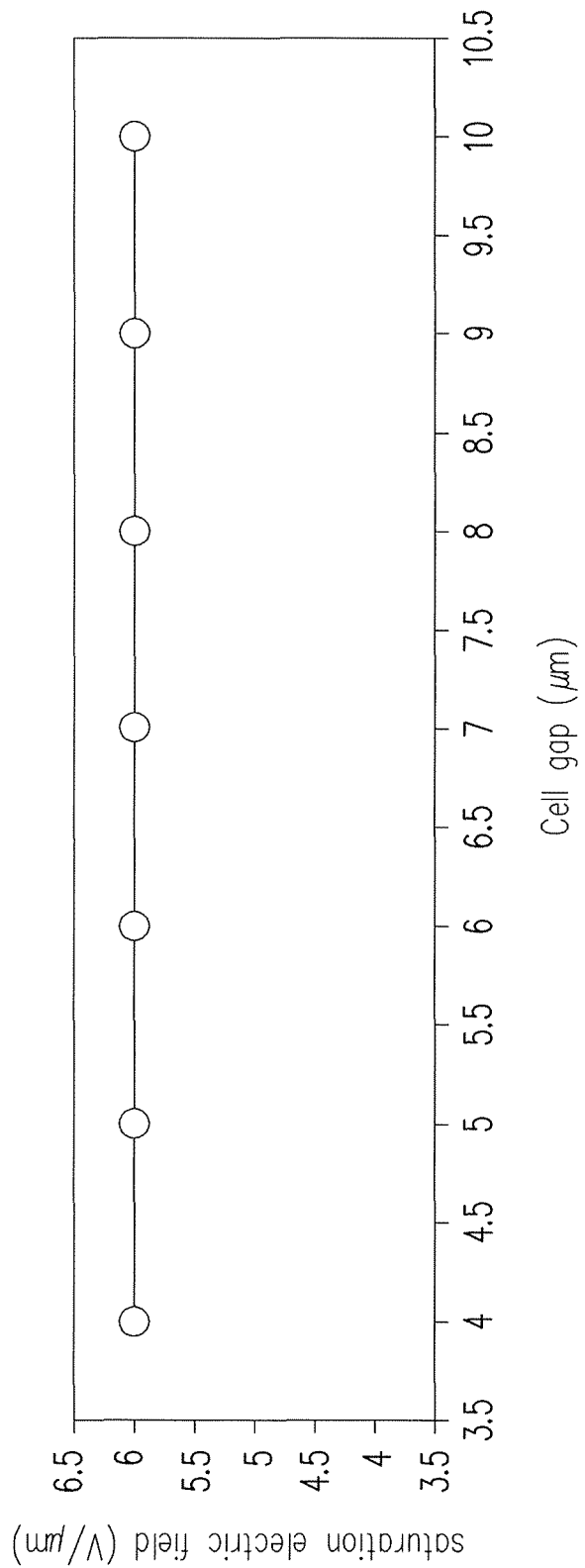
FIG. 13 illustrates a correlation between a cell gap and a saturation electric field of a conventional LCD panel.

2. FIG. 13 illustrates a correlation between a cell gap and a saturation electric field of a conventional LCD panel. Here, a LC layer applied in the conventional LCD is merely equipped with the voltage driven LC layer. As shown in FIG. 13, no matter the cell gap between the upper substrate and the lower substrate in the conventional LCD is small or large (e.g., 4 μm or 10 μm), the saturation electric field of the conventional LCD is at least 6 V/μm. However, as shown in FIG. 4, when the cell gap between the first substrate 110 and the second substrate 120 (i.e., the thickness $D_G$ of the LC layer 130) is 4 μm, the saturation electric field of the LCD panel is 5.5 V/μm; when the cell gap between the first substrate 110 and the second substrate 120 (i.e., the thickness $D_G$ of the LC layer 130) is 7 μm-10 μm, the saturation electric field of the LCD panel is further reduced to 4 V/μm. In view of the above, the saturation electric field of the LCD panel depicted in FIG. 2 can indeed be reduced through adjusting the cell gap between the first substrate 110 and the second substrate 120 (i.e., the thickness $D_G$ of the LC layer 130).

Compared to the conventional LCD panel, the LCD panel provided herein is equipped with the voltage driven LC layer and the induced LC layer. Thereby, the LCD panel described herein not only has the advantages of the BP LC featuring the rapid response speed and the optical isotropy but also has the saturation electric filed that can be reduced by adjusting the cell gap between two substrates. As a result, the LCD panel provided herein is able to resolve the issue of high saturation electric field encountered by the conventional LCD panel.

Figure 5:
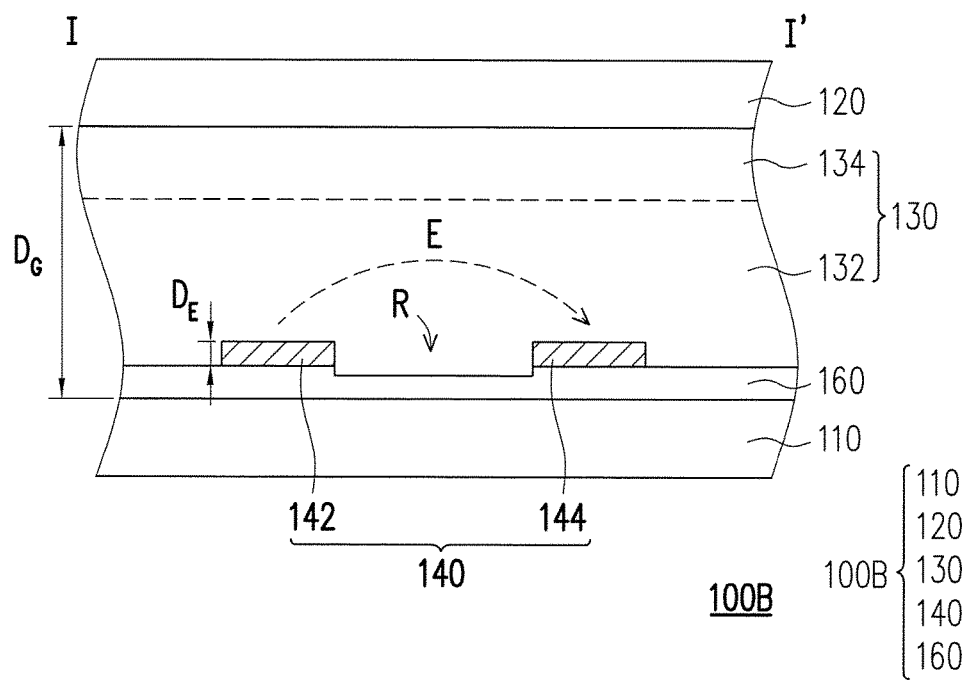
FIG. 5 is a cross-sectional view illustrating a portion of an LCD panel according to an embodiment of the disclosure.

FIG. 5 is a cross-sectional view illustrating a portion of an LCD panel according to an embodiment of the disclosure. The LCD panel 100B depicted in FIG. 5 is similar to the LCD panel 100A depicted in FIG. 2; therefore, the identical or similar elements in these FIG. 5 and FIG. 2 are represented by the identical or similar reference numbers and will not be further explained. The difference between the LCD panel 100B depicted in FIG. 5 and the LCD panel 100A depicted in FIG. 2 lies in that the LCD panel 100B further includes a buffer layer 160 that is located on the first substrate 110, and the electrode patterns 140 are located on the buffer layer 160. Specifically, the buffer layer 160 is located between the electrode patterns 140 and the first substrate 110. The buffer layer 160 located between any two adjacent electrode patterns 140 (i.e., the pixel electrode 140 and the common electrode 144) has a recess pattern R, as shown in FIG. 5.

Figure 6:
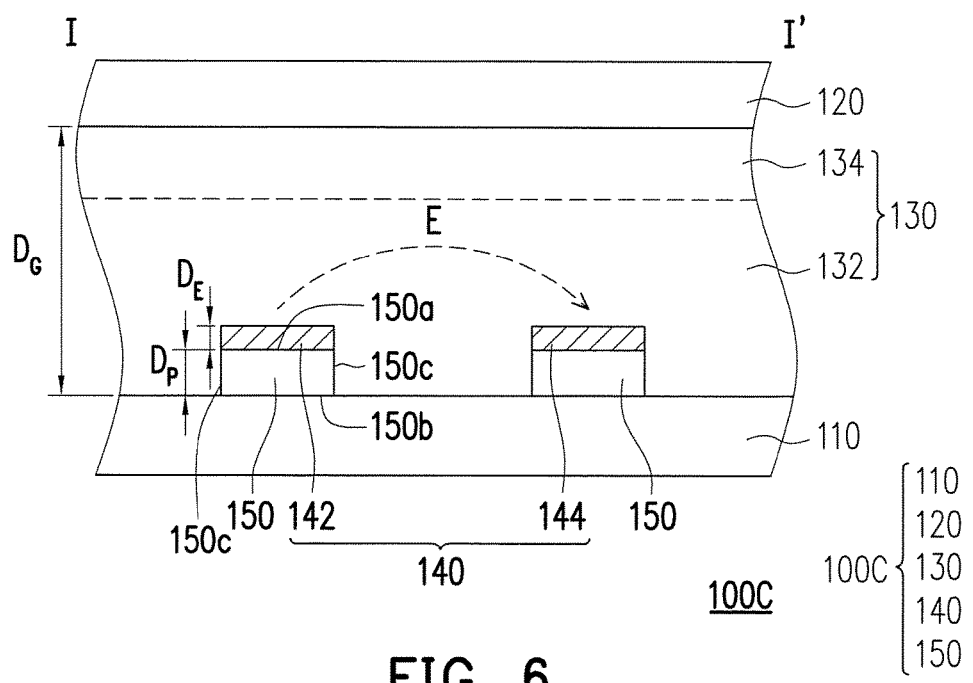
FIG. 6 is a cross-sectional view illustrating a portion of an LCD panel according to another embodiment of the disclosure.

FIG. 6 is a cross-sectional view illustrating a portion of an LCD panel according to another embodiment of the disclosure. FIG. 7A to FIG. 7H are schematic cross-sectional views of electrode patterns and protrusions according to embodiments of the disclosure. The LCD panel 100C depicted in FIG. 6 is similar to the LCD panel 100A depicted in FIG. 2; therefore, the identical or similar elements in these FIG. 6 and FIG. 2 are represented by the identical or similar reference numbers and will not be further explained. The difference between the LCD panel 100C depicted in FIG. 6 and the LCD panel 100A depicted in FIG. 2 lies in that the LCD panel 100C further includes a plurality of protrusions 150, and a thickness $D_P$ of the protrusions 150 is larger than or equal to 0.5 μm.

Figure 7A:
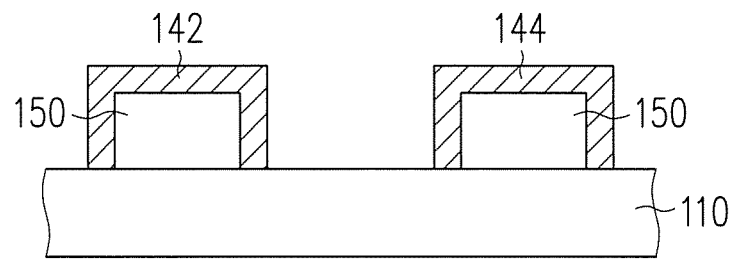
FIG. 7A to FIG. 7H are schematic cross-sectional views of electrode patterns and protrusions according to embodiments of the disclosure.
Figure 7B:
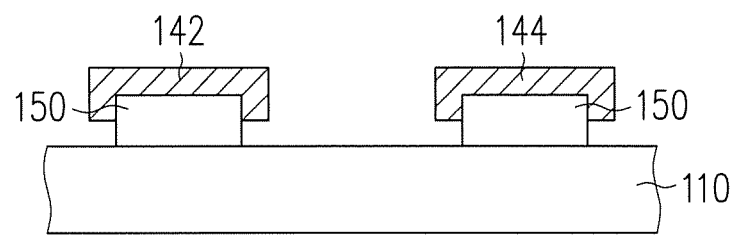

The protrusions 150 are located on the first substrate 110, and each of the electrode patterns 140 (i.e., the pixel electrode 142 and the common electrode 144) are correspondingly arranged on the surfaces of one of the protrusions 150. Specifically, each of the protrusions 150 has a top surface 150a, a bottom surface 150b, and two side surfaces 150c located between the top surface 150a and the bottom surface 150b, as shown in FIG. 6. In the present embodiment, along the sectional line I-I', the shape of the protrusions 150 is rectangle, as shown in FIG. 6, and each of the electrode patterns 140 is located on the top surface 150a of one of the protrusions 150, which should however not be construed as limitations in the disclosure. In an embodiment of the disclosure, along the sectional line I-I', the shape of the protrusions 150 is, for instance, rectangle, in which each of the electrode patterns 140 is located on the top surface 150a and the two side surfaces 150c of one of the rectangular protrusions 150 (as shown in FIG. 7A); alternatively, each of the electrode patterns 140 is located on the top surface 150a and parts of the two side surfaces 150c of one of the rectangular protrusions 150 (as shown in FIG. 7B). That is, the shape of the protrusions 150 and the relative arrangement of the electrode patterns 140 and the protrusions 150 are not limited in the disclosure.

Figure 7C:
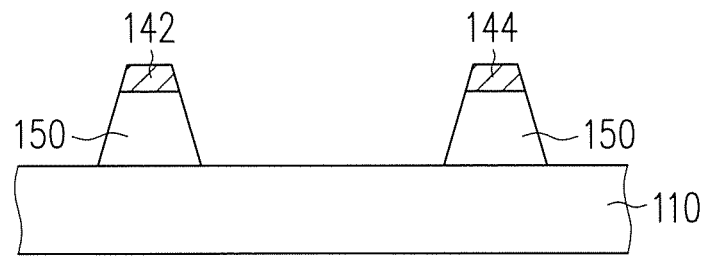
Figure 7D:
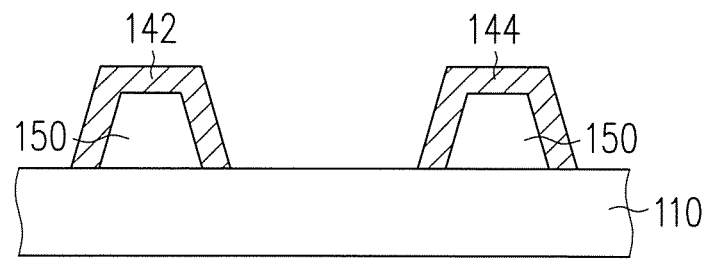
Figure 7E:
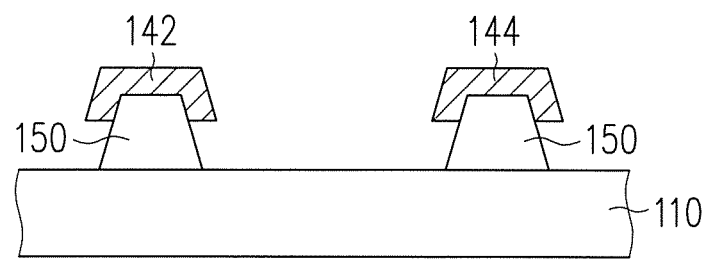
Figure 7F:
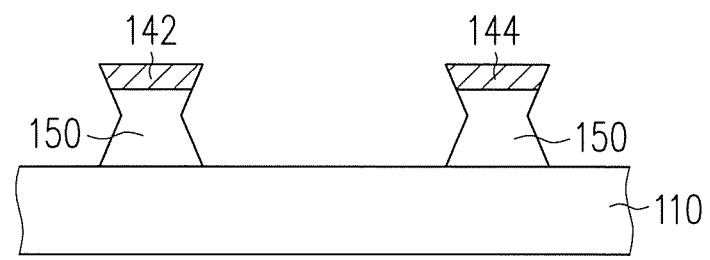
Figure 7G:
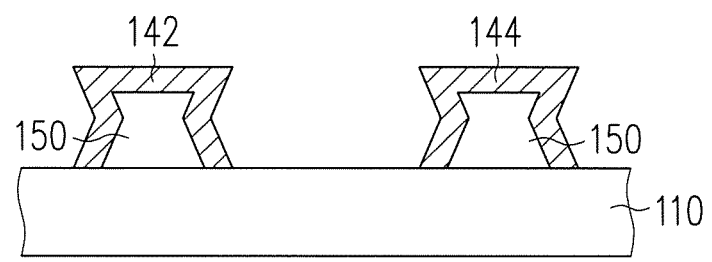
Figure 7H:
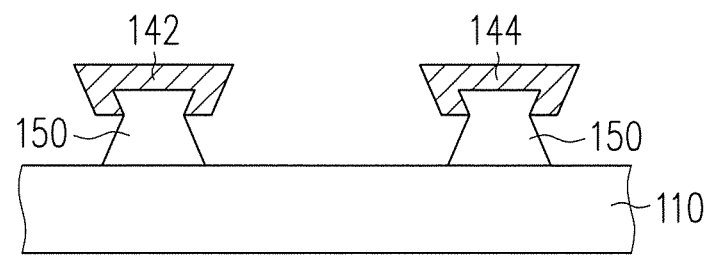

For instance, along the sectional line I-I', the shape of the protrusions 150 is trapezoid, for instance. Each of the electrode patterns 140 is located on the top surface 150a of one of the trapezoid protrusions 150 (as shown in FIG. 7C), located on the top surface 150a and the two side surfaces 150c of one of the trapezoid protrusions 150 (as shown in FIG. 7D), or located on the top surface 150a and parts of the two side surfaces 150c of one of the trapezoid protrusions 150 (as shown in FIG. 7E). In another embodiment of the disclosure, along the sectional line I-I', the protrusions 150 are respectively shaped as double trapezoids (i.e., one trapezoid and one inverted trapezoid whose top surfaces are connected), for instance. Each of the electrode patterns 140 is located on the top surface 150a of one of the double-trapezoid protrusions 150 (as shown in FIG. 7F), located on the top surface 150a and the two side surfaces 150c of one of the double-trapezoid protrusions 150 (as shown in FIG. 7G), or located on the top surface 150a and parts of the two side surfaces 150c of one of the double-trapezoid protrusions 150 (as shown in FIG. 7H). The material of the protrusions 150 is, for instance, an insulation material, such as an inorganic material (e.g., silicon oxide, silicon nitride, silicon oxynitride, a combination thereof, or other suitable materials), an organic material (e.g., polyester (PET), polyethylene, cycloolefin, polyimide, polyamide, polyalcohols, polyphenylene, polyether, polyketone, other suitable materials, or a combination thereof), a combination of the above, or a stacked layer containing the above materials. This should not be construed as a limitation in the disclosure.

Figure 8:
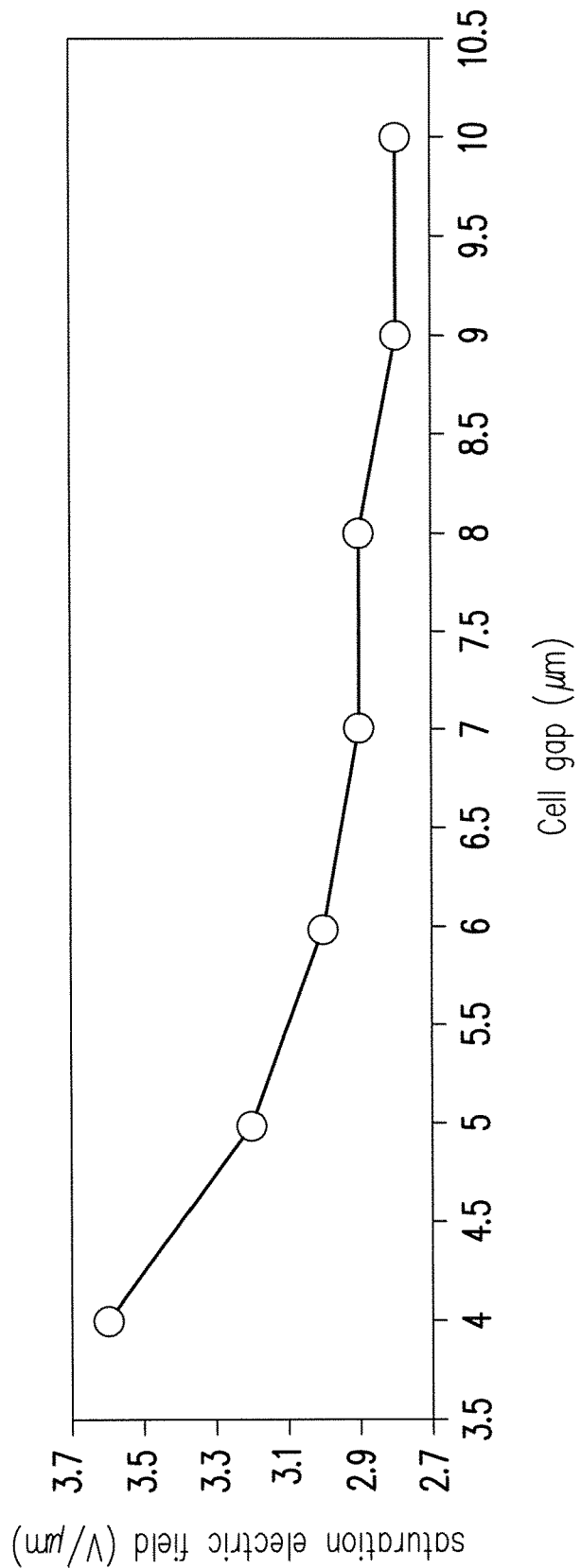
FIG. 8 illustrates a correlation between a cell gap and a saturation electric field of the LCD panel provided in FIG. 6.

FIG. 8 illustrates a correlation between a cell gap and a saturation electric field of the LCD panel provided in FIG. 6. As mentioned above, FIG. 13 illustrates the correlation between a cell gap and a saturation electric field of the conventional LCD panel, where the LC layer applied in the conventional LCD is merely equipped with the voltage driven LC layer. As shown in FIG. 13, no matter the gap between the upper substrate and the lower substrate in the conventional LCD is small or large (e.g., 4 μm or 10 μm), the saturation electric field of the conventional LCD is at least 6V/μm. However, as shown in FIG. 8, when the gap between the first substrate 110 and the second substrate 120 (i.e., the thickness $D_G$ of the LC layer 130) is 4 μm, the saturation electric field of the LCD panel is 3.6 V/μm; when the gap between the first substrate 110 and the second substrate 120 (i.e., the thickness $D_G$ of the LC layer 130) is 9 μm-10 μm, the saturation electric field of the LCD panel is further reduced to 2.8 V/μm. In view of the above, the saturation electric field of the LCD panel depicted in FIG. 6 can indeed be reduced through adjusting the gap between the first substrate 110 and the second substrate 120 (i.e., the thickness $D_G$ of the LC layer 130).

Compared to the conventional LCD panel, the LCD panel provided herein is equipped with the voltage driven LC layer and the induced LC layer. Thereby, the LCD panel described herein not only has the advantages of the BP LC featuring the rapid response speed and the optical isotropy but also has the saturation electric filed that can be reduced by adjusting the cell gap between two substrates. As a result, the LCD panel provided herein is able to resolve the issue of high saturation electric field encountered by the conventional LCD panel.

Figure 9:
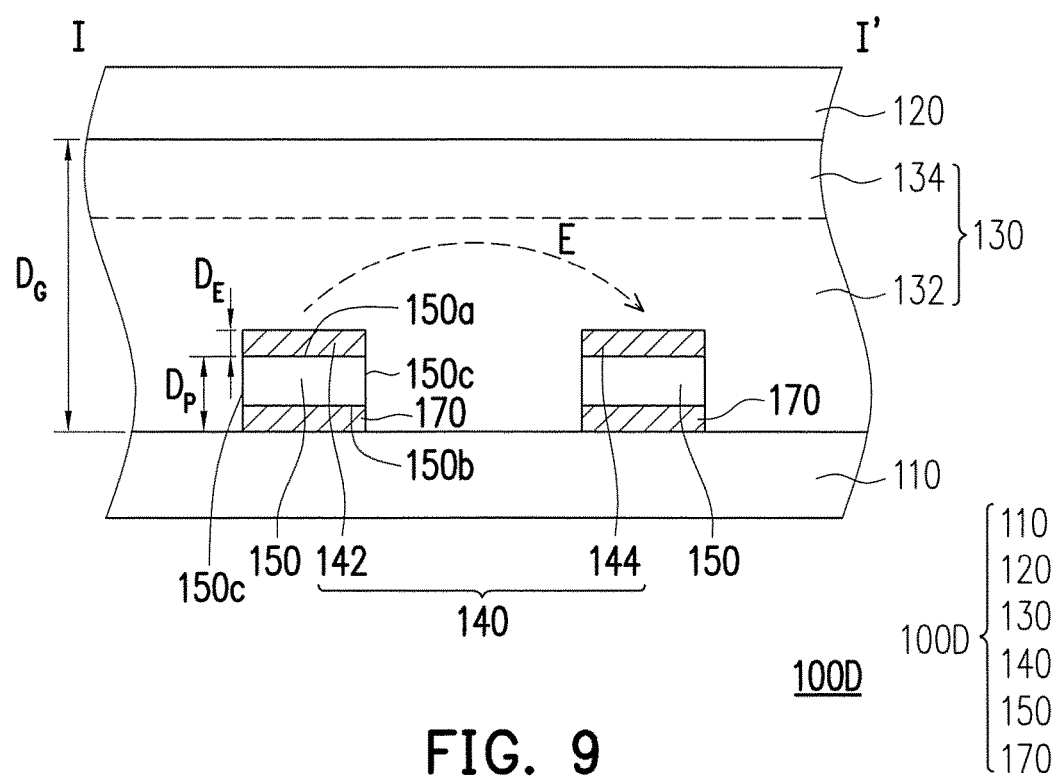
FIG. 9 is a cross-sectional view illustrating a portion of an LCD panel according to an embodiment of the disclosure.
Figure 10A:
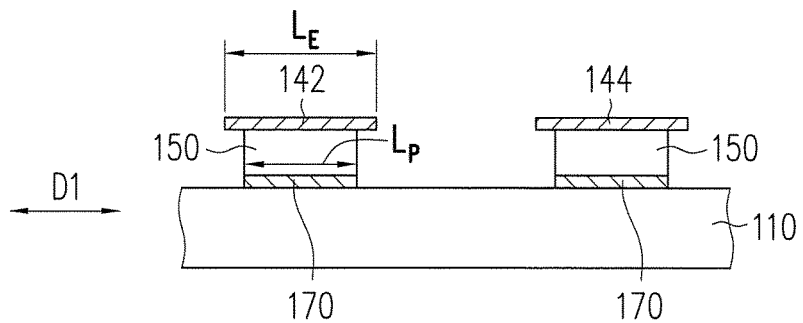
FIG. 10A and FIG. 10B are schematic cross-sectional views of electrode patterns and protrusions according to embodiments of the disclosure.
Figure 10B:
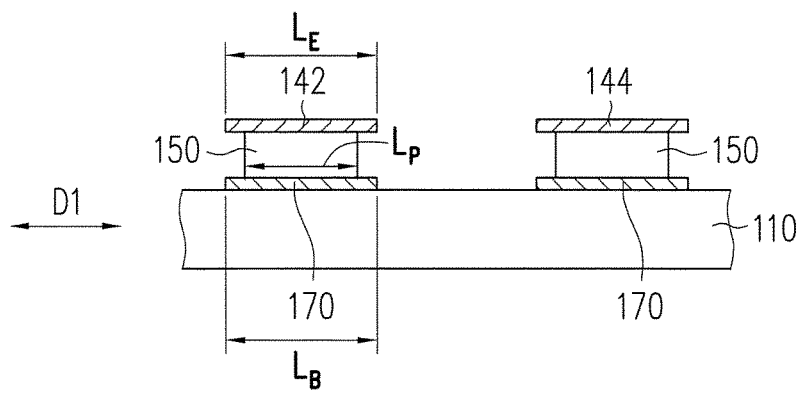

FIG. 9 is a cross-sectional view illustrating a portion of an LCD panel according to another embodiment of the disclosure. FIG. 10A and FIG. 10B are schematic cross-sectional views of electrode patterns and protrusions according to embodiments of the disclosure. The LCD panel 100D depicted in FIG. 9 is similar to the LCD panel 100C depicted in FIG. 6; therefore, the identical or similar elements in these FIG. 9 and FIG. 6 are represented by the identical or similar reference numbers and will not be further explained. The difference between the LCD panel 100D depicted in FIG. 9 and the LCD panel 100C depicted in FIG. 6 lies in that the LCD panel 100D further includes a plurality of bottom electrode patterns 170, and each of the bottom electrode patterns 170 is located on the bottom surface 150b of one of the protrusions 150. That is, the electrode patterns 140 are located on the top surfaces 150a of the protrusions 150, and the bottom electrode patterns 170 are located between the bottom surfaces 150b of the protrusions 150 and the first substrate 110, as shown in FIG. 9. In the present embodiment, along the sectional line I-I', the shape of the protrusions 150 is rectangle, as shown in FIG. 9, for instance. However, the disclosure is not limited thereto, and each of the protrusions 150 may be shaped as a trapezoid, a double trapezoid, or a polygon.

In the present embodiment, along the sectional line I-I', the shape or width/length of each of the electrode patterns 140 and each of the bottom electrode patterns 170 is the same as the shape or width/length of the protrusions 150, as shown in FIG. 9, which should however not be construed as a limitation in the disclosure. In an embodiment of the disclosure, along the sectional line I-I', the bottom electrode patterns 170 and the protrusions 150 have the same width/length, as shown in FIG. 10A, while the shape of each of the electrode patterns 140 is not the same as the shape of each of the protrusions 150 (i.e., a length $L_P$ of the top surface 150a of each protrusion 150 is smaller than a length $L_E$ of each electrode pattern 140 along a first direction $D_1$). In another embodiment of the disclosure, along the sectional line I-I', the shape of each electrode pattern 140 and the shape of each bottom electrode pattern 170 are not the same as the shape of each protrusion 150 (i.e., the length $L_P$ of the top surface 150a of each protrusion 150 is smaller than the length $L_E$ of each electrode pattern 140 and smaller than a length $L_B$ of each bottom electrode pattern 170 along the first direction $D_1$). That is, the shape of the protrusions 150, the relative arrangement of the electrode patterns 140 and the protrusions 150, and the relative arrangement of the bottom electrode patterns 170 and the protrusions 150 are not limited in the disclosure.

Figure 11:
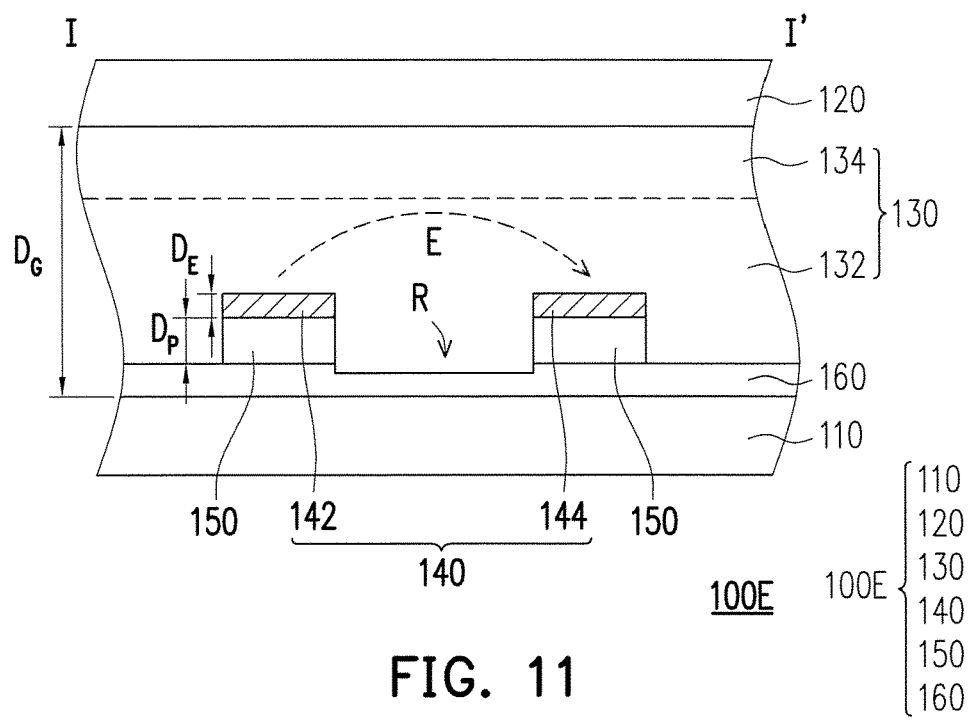
FIG. 11 is a cross-sectional view illustrating a portion of an LCD panel according to an embodiment of the disclosure.

FIG. 11 is a cross-sectional view illustrating a portion of an LCD panel according to an embodiment of the disclosure. The LCD panel 100E depicted in FIG. 11 is similar to the LCD panel 100C depicted in FIG. 6; therefore, the identical or similar elements in these FIG. 11 and FIG. 6 are represented by the identical or similar reference numbers and will not be further explained. The difference between the LCD panel 100E depicted in FIG. 11 and the LCD panel 100C depicted in FIG. 6 lies in that the LCD panel 100E further includes a buffer layer 160 that is located on the first substrate 110, and the electrode patterns 140 are located on the buffer layer 160. Specifically, the buffer layer 160 is located between the electrode patterns 140 and the first substrate 110. The buffer layer 160 located between any two adjacent electrode patterns 140 (i.e., the pixel electrode 140 and the common electrode 144) has a recess pattern R, as shown in FIG. 11. Additionally, the LCD panel 100D depicted in FIG. 9 may further include a buffer layer (not shown) between the bottom electrode patterns 170 and the protrusions 150.

Figure 12:
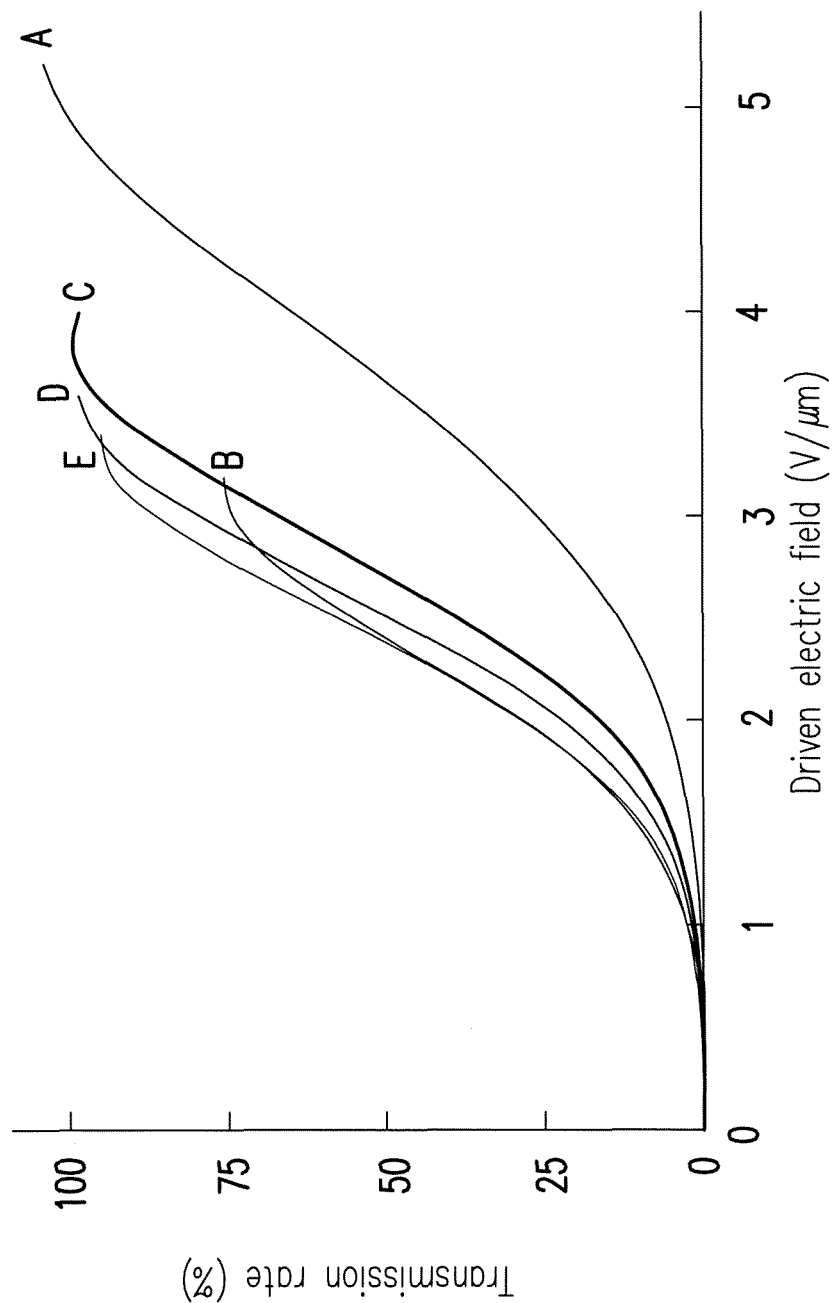
FIG. 12 illustrates a correlation between a driven electric field and a transmission rate of the LCD panels provided in the disclosure.

FIG. 12 illustrates a correlation between a driven electric field and a transmission rate of the LCD panels provided in the disclosure. With reference to FIG. 12, a horizontal axis represents the driven electric field (V/µm), and a vertical axis represents the transmission rate (%). The solid line A represents a measurement curve of the LCD panel depicted in FIG. 2, the solid line B represents a measurement curve of the LCD panel depicted in FIG. 6 (the curve is obtained by applying the electrode patterns 140 and the protrusions 150 shown in FIG. 7D), the solid line C represents a measurement curve of the LCD panel depicted in FIG. 6 (the curve is obtained by applying the electrode patterns 140 and the protrusions 150 shown in FIG. 7F), the solid line D represents a measurement curve of the LCD panel depicted in FIG. 9 (the curve is obtained by applying the electrode patterns 140, the protrusions 150, and the bottom electrode patterns 170 shown in FIG. 10A), and the solid line E represents a measurement curve of the LCD panel depicted in FIG. 9 (the curve is obtained by applying the electrode patterns 140, the protrusions 150, and the bottom electrode patterns 170 shown in FIG. 10B). Note that the cell gap between the two substrates of each of the LCD panels described above remains the same. As shown in FIG. 12, if the solid line A is applied as the benchmark, and if the same driven electric field is applied, the transmission rate of the LCD panel respectively represented by the solid lines B to E is greater than the transmission rate of the LCD panel represented by the solid line A, and the photoelectrical characteristics of the LCD panel respectively represented by the solid lines B to E are also improved. If it is intended to obtain the same transmission rate, the driving voltage required by the LCD panel respectively represented by the solid lines B to E is lower than the driving voltage required by the LCD panel represented by the solid line A, Namely, in view of the LCD panels of aforesaid embodiments provide in the disclosure, as compared with the arrangement of the electrode patterns 140 only, due to the additional arrangement of the protrusions 150 and/or the bottom electrode patterns 170, it is further noted that the same transmission rate can be obtained by applying a relatively low driving voltage.

To sum up, the LCD panel provided herein is equipped with the voltage driven LC layer and the induced LC layer. Thereby, the LCD panel described herein not only has the advantages of the BP LC featuring the rapid response speed and the optical isotropy but also has the saturation electric filed that can be reduced by adjusting the cell gap between two substrates. Given that the saturation electric field stays unchanged, the LCD panel provided herein can display images as normal even though the cell gap between the two substrates is rather large. In addition, thanks to the arrangement of the protrusions, the LCD panel provided herein not only has the improved transmission rate but also has the reduced driving voltage that is required by the LCD panel.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A liquid crystal display panel comprising:
   a first substrate;
   a plurality of electrode patterns located on the first substrate, a lateral electric field being generated via the electrode patterns according to a driving voltage;
   a second substrate located opposite to the first substrate; and
   a liquid crystal layer located between the first substrate and the second substrate, the liquid crystal layer comprising:
      a voltage driven liquid crystal layer located on the electrode patterns and driven by the driving voltage to be optically anisotropic or optically isotropic; and
      an induced liquid crystal layer located between the voltage driven liquid crystal layer and the second substrate and induced to be optically anisotropic through the voltage driven liquid crystal layer being driven to be optically anisotropic,
   wherein a thickness of the liquid crystal layer is larger than 4 µm.

2. The liquid crystal display panel according to claim 1, wherein the thickness of the liquid crystal layer is 7.5 µm to 9.2 µm.

3. The liquid crystal display panel according to claim 1, wherein a thickness of each of the electrode patterns is smaller than 0.5 µm.

4. The liquid crystal display panel according to claim 1, further comprising a plurality of protrusions on the first substrate, each of the electrode patterns being correspondingly arranged on a surface of one of the protrusions.

5. The liquid crystal display panel according to claim 4, wherein a thickness of each of the protrusions is larger than or equal to 0.5 µm.

6. The liquid crystal display panel according to claim 4, wherein each of the protrusions comprises a top surface, a bottom surface, and two side surfaces located between the top surface and the bottom surface, and the electrode pattern on each of the protrusions is located on the top surface of the corresponding protrusion.

7. The liquid crystal display panel according to claim 6, further comprising a plurality of bottom electrode patterns, each of the bottom electrode patterns being correspondingly located on the bottom surface of one of the protrusions.

8. The liquid crystal display panel according to claim 4, wherein each of the protrusions comprises a top surface, a bottom surface, and two side surfaces located between the top surface and the bottom surface, and the electrode pattern on each of the protrusions is located on the top surface of the corresponding protrusion and covers at least a portion of the two side surfaces of the corresponding protrusion.

9. The liquid crystal display panel according to claim 4, further comprising a buffer layer on the first substrate, the protrusions being located on the buffer layer, the buffer layer located between two adjacent protrusions having a recess pattern.

10. The liquid crystal display panel according to claim 1, further comprising a buffer layer on the first substrate, the electrode patterns being located on the buffer layer, the buffer layer located between two adjacent electrode patterns having a recess pattern.

* * * * *